United States Patent
Nelson et al.

(10) Patent No.: US 7,333,489 B1
(45) Date of Patent: Feb. 19, 2008

(54) SYSTEM AND METHOD FOR STORING FRAME HEADER DATA

(75) Inventors: Michael A. Nelson, Portland, OR (US); Thomas W. Bucht, Hillsboro, OR (US)

(73) Assignee: Crossroads Systems, Inc., Austin, TX (US)

( * ) Notice: Subject to any disclaimer, the term of this patent is extended or adjusted under 35 U.S.C. 154(b) by 623 days.

(21) Appl. No.: 09/695,755

(22) Filed: Oct. 24, 2000

Related U.S. Application Data

(60) Provisional application No. 60/202,836, filed on May 8, 2000.

(51) Int. Cl.
   *H04L 12/28* (2006.01)
   *H04L 12/56* (2006.01)
(52) U.S. Cl. ..................... 370/392; 370/412
(58) Field of Classification Search ................ 370/384, 370/392, 395.5, 395.52, 395.7–395.72, 400–408, 370/412–424, 428–429
   See application file for complete search history.

(56) References Cited

U.S. PATENT DOCUMENTS

| | | | | |
|---|---|---|---|---|
| 4,845,722 A | * | 7/1989 | Kent et al. | 370/388 |
| 4,977,582 A | * | 12/1990 | Nichols et al. | 375/371 |
| 5,163,136 A | | 11/1992 | Richmond | 395/275 |
| 5,278,830 A | | 1/1994 | Kudo | 370/94.1 |
| 5,619,497 A | * | 4/1997 | Gallagher et al. | 370/394 |
| 6,032,190 A | | 2/2000 | Bremer et al. | 709/238 |
| 6,128,666 A | * | 10/2000 | Muller et al. | 709/238 |
| 6,317,415 B1 | * | 11/2001 | Darnell et al. | 370/230 |
| 6,424,659 B2 | * | 7/2002 | Viswanadham et al. | 370/469 |
| 6,529,503 B1 | * | 3/2003 | Chiang et al. | 370/363 |
| 6,567,414 B2 | * | 5/2003 | Deng et al. | 370/402 |
| 6,577,636 B1 | * | 6/2003 | Sang et al. | 370/395.7 |
| 6,731,644 B1 | * | 5/2004 | Epps et al. | 370/412 |
| 6,870,809 B1 | * | 3/2005 | Vaidya et al. | 370/229 |

OTHER PUBLICATIONS

Douglas E. Corner, Internetworking with TCP/IP vol. 1 Principles, Protocols, and Architecture, Prentice Hall, 3rd Edition, 1995, p. 99.*
International Search Report for corresponding international application PCT?US01/14682 dated Dec. 21, 2001.

* cited by examiner

*Primary Examiner*—Daniel J. Ryman
(74) *Attorney, Agent, or Firm*—Sprinkle IP Law Group

(57) ABSTRACT

A system and method for storing header information in parallel with corresponding frames of data, wherein the frames of data are stored in a first-in-first-out buffer and wherein the header information is accessed to make routing decisions for the frames of data while avoiding having to read the frames out of the buffer. In one embodiment, this buffer system is implemented in a port of a network switch. Receive logic in the port stores frames of data in the storage elements of a FIFO buffer and concurrently snoops on the frame data to obtain header information. The header information is stored in a buffer separate from the FIFO that stores the frames. The header information can be read from the header buffer rather than the frame buffer. A routing decision for each frame can be made before a previous frame is completely read out of the frame FIFO, hence before the corresponding frame is ready to be transmitted. A timer may also be associated with each header in the header buffer so that it can be determined when frames are stale and must be discarded.

7 Claims, 3 Drawing Sheets

SYSTEM AND METHOD FOR STORING FRAME HEADER DATA

This application claims the benefit of the filing date of U.S. Provisional Patent Application Ser. No. 60/202,836 by inventors Michael A. Nelson and Tom Bucht, entitled "System and Method for Storing Frame Header Data," filed on May 8, 2000.

FIELD OF THE INVENTION

The invention relates generally to data communication in computer systems, and more particularly to a system and method implemented in connection with packet switching protocols wherein packet (frame) header information is stored in a buffer separate from the corresponding packet buffer to allow routing decisions to be made based on the header information without reading the packet out of the buffer.

BACKGROUND OF THE INVENTION

Individual computer systems can be combined to form networks. There are many different types of networks, including local area networks (LANs,) wide area networks (WANs,) storage area networks (SANs) and many others. Networks are typically characterized by several characteristics, including their protocols, their architectures and their topologies.

Networks may be configured in various topologies, such as rings or loops, point-to-point connections or switched networks. Switched networks use a set of interconnected switches to establish data paths between several computers or other devices. Typically, devices connected to a switched network will format data to be transmitted between them into packets, or frames, which are then routed through the network. The frames include data which is used to transport them from a source to a destination (i.e., header information) as well as the data which the source wishes to send to the destination.

Referring to FIG. 1, a flow diagram illustrating the process by which frames are routed through a switch is shown. When a frame is received by a particular switch, the switch typically stores the frame (including the corresponding header) in a buffer until it can be sent to another device. This device may be the destination device or an intermediate device which will route the frame to another switch or to the destination device. This buffer is normally a first-in-first-out (FIFO) buffer. When a frame reaches the head of the FIFO buffer, it can be routed (transmitted) by the switch. In order for the switch to make a routing decision for the frame, it must examine the frame's header to obtain the corresponding transport information. Because the transport information is stored only in the header of the frame which is in the FIFO, at least part of the frame must be read out of the FIFO so that the transport information can be read. The information which is read out of the FIFO must then be stored while the routing decision is made. Only after the routing decision has been made can the frame be routed by the switch. Because the frame must be read from the FIFO and stored in the second location while the routing decision is made, the latency of the frame's transport from the source device to the destination device is increased.

SUMMARY OF THE INVENTION

One or more of the problems outlined above may be solved by the various embodiments of the present invention which, broadly speaking, comprises a system and method for storing header information in parallel with corresponding packets or frames of data, wherein the frames of data are stored in a first-in-first-out buffer and wherein the header information is accessed to make routing decisions in order to avoid having to read the frames out of the buffer.

In one embodiment, the invention comprises a buffer system implemented in each port of a network switch. Receive logic in the port stores frames of data in the storage elements of a FIFO buffer and concurrently snoops on the frame data to obtain header information. The header information is stored in a buffer separate from the FIFO that stores the frames. The header information can be read from the header buffer rather than the frame buffer. This eliminates the need to read a portion of the frame out of the FIFO and store this information in another buffer while a routing decision is made. It also allows the routing decision to be made before the second buffer becomes available. A timer may also be associated with each header in the header buffer so that it can be determined when frames are stale and must be discarded.

In another embodiment, the invention comprises a method wherein when frames first arrive at a port, the frames are "snooped" (i.e., examined) and the information in the header field is copied to a frame header register. At the same time, a timer associated with the header entry is started. This timer continues to run while the header and the frame are stored in their respective buffers. When the time comes to forward the frame at the head of the FIFO, the header register and timer are examined and the routing decision made. As that frame is being read out of the FIFO, the header corresponding to the next frame is examined, so the routing decision for the second frame can be made before the first frame has been completely read out of the FIFO.

BRIEF DESCRIPTION OF THE DRAWINGS

Other objects and advantages of the invention may become apparent upon reading the following detailed description and upon reference to the accompanying drawings in which.

Figure 1:
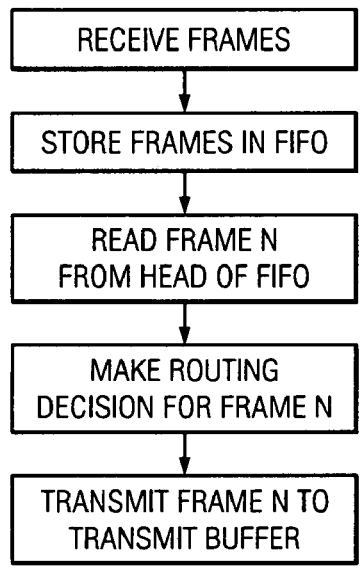
FIG. 1 is a flow diagram illustrating the process by which frames are routed through a switch.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the spirit and scope of the present invention as defined by the appended claims.

DETAILED DESCRIPTION OF THE PREFERRED EMBODIMENT

A preferred embodiment of the invention is described below. It should be noted that this embodiment and other embodiments described below are exemplary and are intended to be illustrative of the invention rather than limiting.

In one embodiment, the invention comprises a buffer system wherein header information is stored in a buffer separate from the FIFO that stores the frame itself. The header information can be read from the header buffer rather than the frame buffer. This eliminates the need to read part of the frame out of the FIFO and store this data in another buffer while a routing decision is made. A timer may also be associated with each header in the header buffer so that it can be determined when frames are stale and must be discarded.

In another embodiment, the invention comprises a method wherein when frames first arrive at a port, the frames are "snooped" (i.e., examined) and the information in the header field is copied to a frame header register. At the same time, a timer associated with the header entry is started. This timer continues to run while the header and the frame are stored in their respective buffers. When the time comes to forward the frame at the head of the FIFO, the header register and timer are examined and the routing decision made. ("Forward" as used here refers to the transmission of the frame along the next leg of its journey to the destination device.) As that frame is being read out of the FIFO, the header corresponding to the next frame is examined, so the routing decision for the second frame can be made before the first frame has been completely read out of the FIFO.

The invention may provide a number of advantages over the prior art. For example, since each frame does not need to be read out of the FIFO and stored in another buffer while the routing decision for the frame is made, the latency of the frame's transport may be reduced. The amount of logic required in the system may also be reduced by eliminating this step. Still further, a routing decision can be made before the frame is ready to be transmitted, so the throughput of the system may be increased.

In one embodiment, the present system is implemented in a Fibre Channel switch. "Fibre Channel" refers to an data communication technology, as well as a set of standards being developed by the American National Standards Institute (ANSI) to define the technology. Fibre Channel supports both shared media and dedicated, or switched, media. Fibre Channel can be used to provide means for data transfer in many different systems, supporting workstation clusters, switched LANs, SANs (storage area networks) and the like.

Despite its name, "Fibre Channel" technology is not strictly a channel-oriented technology, nor does it represent a network topology. Fibre Channel allows devices to be interconnected in a more generalized scheme. In this scheme, devices may be connected by fibre channel links in several configurations, including point-to-point and loop configurations, as well as what is referred to as a "fabric." The fabric is formed by one or more interconnected Fibre Channel links and switches. Devices can then be interconnected through the fabric. The fabric may be a circuit switch, an active hub or a loop. These devices may be cascaded together to increase the number of available ports in the fabric.

Each Fibre Channel link consists of a pair of unidirectional fibers. Each fiber is connected to an associated transmitter and receiver. The link is connected between a pair of data ports. Data is transmitted from a first one of the ports to a second one of the ports over a first one of the fibers (and the corresponding transmitter and receiver.) Data which is transmitted from the second port to the first port is carried on the second fiber. The transmitters and receivers are managed by controllers at the respective ports.

Figure 2:
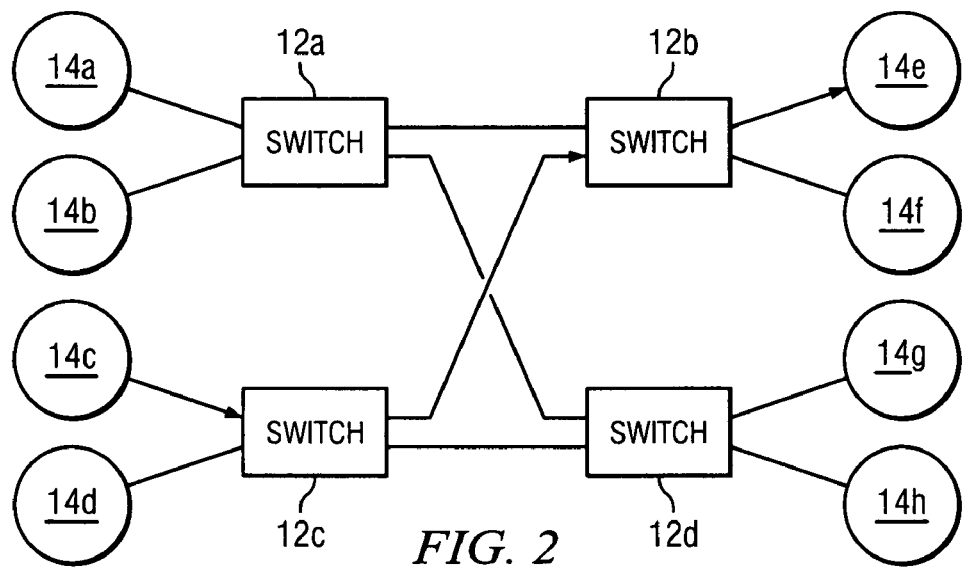
FIG. 2 is a diagram illustrating the interconnection of a plurality of devices via a fibre channel fabric in one embodiment.

As noted above, the Fibre Channel fabric may include one or more interconnected switches. Referring to FIG. 2, a diagram illustrating the interconnection of a plurality of sites, or devices, via a Fibre Channel fabric is shown. Each of the switches 12 which together form fabric 10 is configured to receive and buffer frames of data from a source (in this case, 14c), to make routing decisions for the frames, and to transmit the frames to the appropriate destination (in this case, 14e). In the system illustrated in FIG. 2, frames are shown being routed from site 14c, through switch 12c, then through switch 12b, and finally to destination site 14e. Each switch has at least two ports and typically has a maximum of 16 ports (although this may vary.) Each of the ports in a Fibre Channel switch has a receive fibre and a transmit fibre. Normally, frames are received at one of the ports and are transmitted to another one of the ports within the switch.

It should be noted that, for the purposes of this disclosure, identical items in the figures may be indicated by identical reference numerals followed by a lowercase letter, e.g., 12a, 12b, and so on. The items may be collectively referred to herein simply by the reference numeral.

Figure 3:
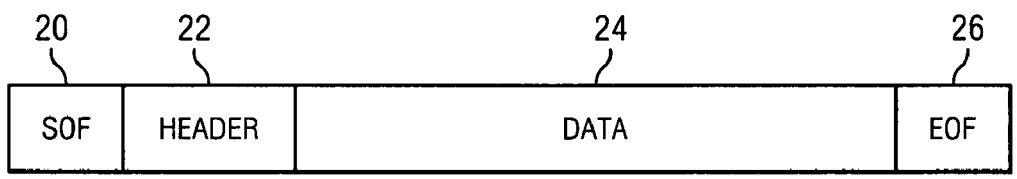
FIG. 3 is a block diagram illustrating the structure of a frame of data in one embodiment.

Referring to FIG. 3, a block diagram illustrating the structure of a frame in one embodiment is shown. In this embodiment, each frame includes a start-of-frame (SOF) primitive 20, a header 22, data 24, and an end-of-frame (EOF) primitive 26. SOF primitive 20 identifies the beginning of a frame. EOF primitive 26 similarly serves to identify the end of the frame. All of the data of a frame, whether useful data or overhead data, is enclosed between the SOF and EOF primitives. Header 22 comprises overhead data related to the frame. In particular, Header 22 includes information identifying the destination of the frame. The destination information is used by the switches to make the routing decisions necessary to deliver the frame to the target site or device. Data 24 comprises useful data. In other words, data 24 is the data which the was originally intended to be delivered from the source to the destination.

Figure 4:
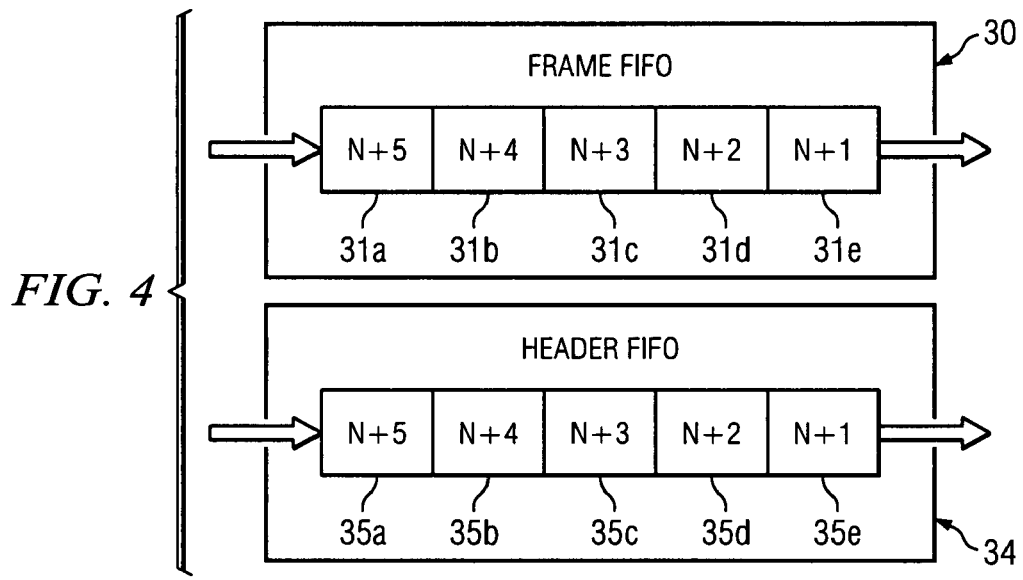
FIG. 4 is a block diagram illustrating the manner in which frames of data are buffered in one embodiment.

Referring to FIG. 4, a block diagram illustrating the manner in which frames of data are buffered in one embodiment is shown. Data which is received at a port is examined for the SOF primitive which identifies the beginning of a frame. When the SOF primitive is detected, the port makes a decision to store the corresponding frame in a frame FIFO 30 of the port. The frame (i.e., all of the data received by the port, from the SOF primitive up to and including the EOF primitive) is stored in one of the storage locations 31 in FIFO 30. Frames are read out of FIFO 30 and transmitted in the order in which they were written to the FIFO. The frame which has been in FIFO 30 for the longest time is at the head 31e of the FIFO and is the next frame to be read out. The frame which has been in FIFO 30 for the shortest time is at the tail 31a of the FIFO. All of the other frames in the FIFO will be read out before this frame. When the port is ready to transmit one of the frames to another port, it moves the frame at the head 31e of FIFO 30 to a transmit buffer in the other port. (This assumes that the other port has a transmit buffer. It should be noted that a transmit buffer is not required at the destination port.)

In addition to frame buffer 30, the port includes a header buffer 34. As described above, the SOF primitive signals the beginning of a frame and is followed by the frame header. The port snoops on the received data and, as the header is received, the port copies the header to a FIFO which serves as header buffer 34. (The port may alternately copy only selected routing information to header buffer 34.) The headers of the received frames are stored in storage locations 35 within header buffer 34, with the oldest entry at the head 35*e* of header buffer 34 and the newest entry at the tail 35*a* of header buffer 34. When the port is ready to make a routing decision for one of the frames in frame buffer 30, the corresponding header is read out of header buffer 34.

The headers stored in header buffer 34 roughly correspond to the frames stored in frame buffer 30. That is, there is normally a one-to-one correspondence between the frames and the headers. If header buffer 34 comprises a destructive FIFO, then a header register (not shown) is used to hold the header that would otherwise reside at the head of header buffer 34. This is because the header in this position needs to be retained after it is read, which is not possible with a destructive FIFO alone. (The header register may also need to be used in some implementations which store the headers in RAM.) If header buffer 34 comprises a set of registers, the header in position 35*e* can be read non-destructively.

The header corresponding to the frame at the head of the frame buffer is read to determine the destination port to which the frame will be sent. Because the header can be read from header buffer 34 (or a subsequent header register,) the port can potentially make a routing decision for the frame before it is ready to be transmitted. When the frame at the head of FIFO 30 is moved to the destination port, the subsequent frame is moved to the head of FIFO 30 and the header corresponding to the subsequent frame is moved to the head of header buffer 34 so that a routing decision can be made for the subsequent frame. The present system thus overlaps the routing decision for a frame with the transmission of the preceding frame, thereby reducing the latency in transporting the frames through the port.

In prior art systems, the routing decision for the frame in the frame buffer was made when the frame was ready to be transmitted to the transmit buffer of the destination port. Consequently, a routing decision for the subsequent frame could not be made until the previous frame had been transmitted to its destination port. In the present system, the header information for a frame can be accessed before the frame comes to the head of the frame buffer. Accordingly, when the frame comes to the head of the frame buffer, it can immediately be transferred to the appropriate transmit buffer according to the routing decision that was made while it was still being promoted through the frame buffer. This eliminates the delay of making the routing decision after the frame header can be read out of the frame buffer. (It should be noted that the transmit buffer may have an associated timer which is used to enforce rules regarding the discarding of frames that become stale in the transmit buffer.)

In one embodiment, the system uses register elements to store the header information. The header register elements each comprise a chain of cascaded flip-flops, timers, and controllers which is sufficiently large to hold a frame header. The header register has enough locations to match the number of frames the FIFO can hold. Each location is aware if it holds an entry that has not been processed yet, and if the entry in the previous location (newer entries) has been processed (utilizing a VALID state flag). If a location has an entry that has been processed (VALID flag false) and the previous location has an unprocessed location (VALID flag true), then information is loaded from the previous location to the current location, the VALID flag for the previous location is marked as false, and the VALID flag for the current location is marked as true.

In another embodiment, dual port RAM can be used to store the header information. While RAM implementations do not have the same physical first-in-first-out constraints of FIFO memory devices, the same operation can be achieved using pointer manipulation. Headers in the RAM are accessed in a circular manner with read and write pointers. Rather than promoting information from one storage element to the next, the read and write pointers are advanced. It should be noted that the frame FIFO can also be implemented using these different types of memory elements. The present system may provide advantages in a RAM implementation as well as a FIFO implementation because it may reduce the need for some of the pointer manipulation which is used to achieve the first-in-first-out behavior.

The header buffer has a set of timers that are started when corresponding entries are made in the header buffer. The header for each frame has its own timer. Just like the data, the timer information is promoted from one stage to the next. If a timer increment would occur simultaneously with a timer promotion, the promotion is held off until after the timer has been incremented (so the increment is not lost). Since the header information is stored in the header buffer at the same time the frame is stored in the FIFO, the timers can be used to determine how long each frame has been in the buffer. This is necessary because the switch in this embodiment is assumed to implement rules which must be enforced regarding the aging of frames. For example, frames may not be allowed to remain in the buffer for more than one second. If the timer for a particular header, hence a particular frame, indicates that the header and frame have been stored for more than one second, the frame is discarded rather than being transmitted when it reaches the head of the buffer.

It is contemplated that various methods can be used to store timer information. For example, when using register storage elements, cascaded pre-loadable counters can be used. These counters can forward the count for each of the frames/headers from one stage to the next. For RAM based storage of header information, resettable but not loadable counters can be used. A specific counter can be configured to hold the count for a frame/header for the entire time the information is valid, rather than promoting counts through stages. Another method uses less resources, but requires a more complicated controller. This method stores the count value in RAM along with the routing information (utilizing unused RAM locations). When it is time to increment the timers (approximately every 100 milliseconds) a circuit reads the current count, adds one to it, and rewrites the new value to RAM. An arbiter circuit can give top priority to writing and reading the routing information. The adder state machine can be paused when it is time to read or write routing information, and then resumed.

Figure 5:
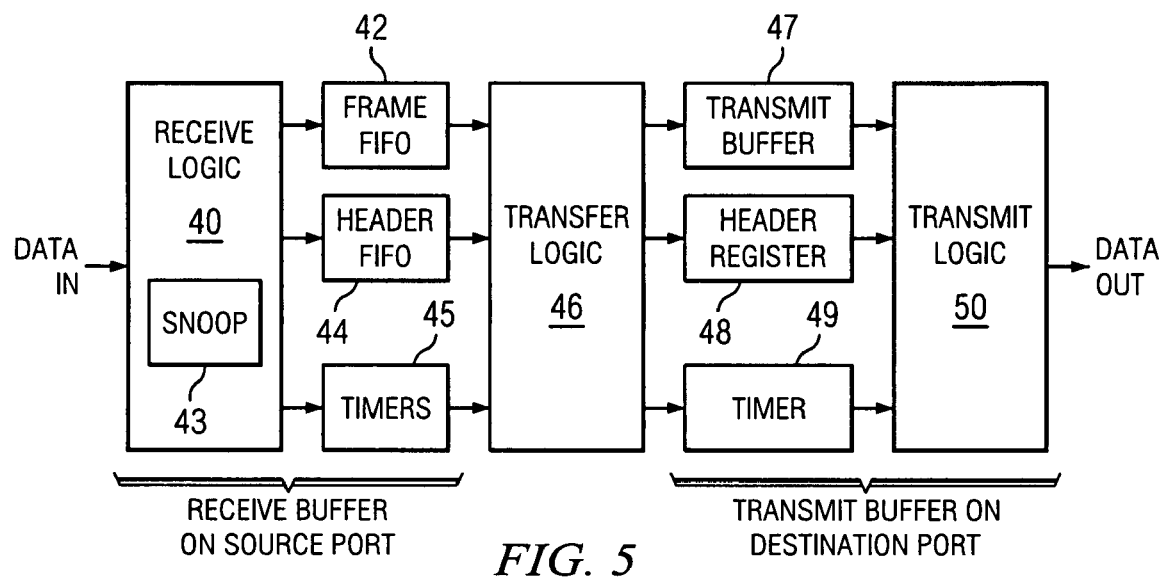
FIG. 5 is a block diagram illustrating an embodiment of the present system which includes timers corresponding to the frame and header information.

Referring to FIG. 5, a block diagram illustrating an embodiment of the present system which includes timers corresponding to the frame and header information is shown. In this figure, data which is transmitted to a port is received by receive logic 40. Receive logic 40 is configured to detect the SOF and EOF primitives which define the boundaries of frames in the received data and to store individual frames to locations in frame FIFO 42. Receive logic 40 includes circuitry to snoop on the received data and to copy the header of each frame to header FIFO 44. The copying of a header to header FIFO 44 occurs in parallel with the storage of the corresponding frame in frame FIFO 42. When a header is copied to header FIFO 44, a corresponding timer 45 is started. (While there is a separate timer for each header, a single timer block is shown in the figure.)

The frames, headers and timers are promoted through the storage locations of their respective storage buffers. The header at the head of header FIFO 44 is read by transfer logic 46 and a routing decision for the corresponding frame in frame FIFO 42 is made. When the frame reaches the head of frame FIFO 42, it is routed by transfer logic 46 to transmit buffer 47 if the FIFO is available. Transfer logic 46 is configured to read the value of the timer corresponding to the header at the head of header FIFO 44. If the timer has exceeded the predetermined maximum value, the corresponding header and frame are discarded. Otherwise, they are transferred normally to the transmit FIFO. (As explained above, the header and frame are discarded because they have become stale.) When the header and frame are either discarded or transferred to the transmit buffer 47 (and corresponding header register 48,) the frames, headers and timers are promoted through in the receive buffers (frame and header FIFOs.)

Transfer logic 46 is configured to make routing decisions for the frames that are received by a port. Transfer logic 46 reads the frame at the head of receive buffer 42 and transmits it to another port. The routing decision for this frame is made by transfer logic 46 before the frame reaches transmit buffer 47. While the frame is being moved from the receive FIFO 42 to the transmit buffer 47, transfer logic 46 examines the next header in FIFO 44 and makes a routing decision for the corresponding frame in receive FIFO 42.

The header buffer system can be implemented in the destination port as well as the receive port. Thus, while one frame is being transmitted from transmit buffer 47, the header for the next frame can be transferred to header register 49, where it can be examined by transmit logic 50 in preparation for transmitting the corresponding frame.

It should be noted that a header bypass scheme can be implemented in the present system. If the header buffer is empty, new entries may have to be promoted through the sequential storage locations of the header buffer before reaching the head of the buffer and becoming available to move into the transmit header register. This adds unnecessary latency to the transport of the frames through the port. Bypass logic can be added to the system to move the headers immediately to the head of the header buffer.

Figure 6:
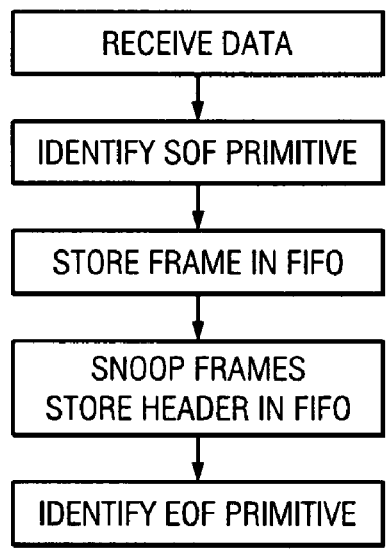
FIG. 6 is a flow diagram illustrating a method for storing received frames in a frame FIFO and copying header data for the frames in a header FIFO in one embodiment.
Figure 7:
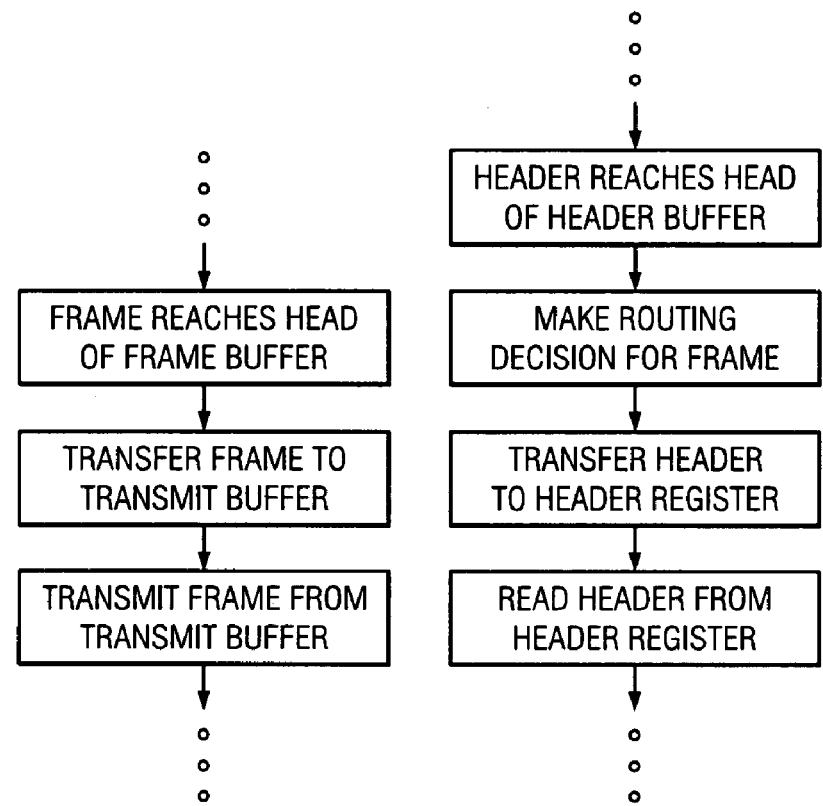
FIG. 7 is a flow diagram illustrating a method for moving frames from a FIFO to a transmit buffer and transmitting the frames to a subsequent port in one embodiment.

Referring to FIGS. 6 and 7, flow diagrams illustrating the method implemented in one embodiment of the present system is shown. FIG. 6 illustrates the initial stage of the process. As shown in the figure, frames are received at the port. When an SOF primitive is identified, the primitive and the frame which follows are stored in the frame FIFO. At the same time, the received data is snooped to identify header data. The header for the frame is copied and stored to the header FIFO. When an EOF primitive is detected, receipt of the frame by the port is complete. This portion of the process is repeated as more data is received.

Referring to FIG. 7, another part of the process that occurs subsequent to the storing of a frame and corresponding header in the buffers of the receive port is illustrated. In this figure, the process includes two sets of operations which occur substantially in parallel. The left side of the figure illustrates the transport of frames from the frame buffer of the receive port to the transmit buffer of the transmit port and the subsequent transmission of the frames. The right side of the figure illustrates the movement of header information to the head of the header buffer (and the subsequent routing decision) and the transfer of the header to the header register (and the corresponding transmit decision.)

First, the header information reaches the head of the header buffer. This information is used to make a routing decision for the corresponding frame. The frame may not have reached the head of the frame buffer yet because the previous frame may be in the process of being transferred to the transmit buffer of a transmit port. The header information is nevertheless available to be used for the routing decision. After the routing decision has been made, and after the frame reaches the head of the frame buffer, the frame can be transferred to the appropriate transmit buffer. When the frame is transferred, the corresponding header information is transferred to the header register of the transmit port. The header information can then be read from the header register if necessary to make a routing decision for the transmission of the frame from the transmit buffer. The frame is then transmitted from the transmit buffer. It should be noted that, while FIG. 7 suggests that certain ones of the depicted steps may occur before others, these relationships do not necessarily apply to all implementations of the present system and method.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method comprising:

receiving a plurality of frames;

storing the frames in a receive buffer, wherein the receive buffer is configured to be accessed in a first-in-first-out fashion;

storing duplicated header information corresponding to each of the frames in a header storage, wherein the header storage is configured to provide access to the duplicated header information in the same order as the frames;

maintaining a timer corresponding to each duplicated header information in the header storage that indicates how long the corresponding duplicated header information has been in header storage;

retrieving duplicated header information from the header storage, wherein the duplicated header information corresponds to a first frame;

prior to the first frame reaching a head position in the receive buffer, making a routing decision for delivering the first frame to its destination based upon the duplicated header information read from the header storage;

retrieving the first frame from the receive buffer; and routing the first frame based upon the routing decision.

2. The method of claim 1, further comprising retrieving the timer corresponding to the retrieved duplicated header information, determining whether the timer corresponding to the retrieved duplicated header information exceeds a predetermined maximum value, and discarding the frame corresponding to the duplicated header information if the timer corresponding to the retrieved duplicated header information exceeds the predetermined maximum value.

3. The method of claim 1, wherein the receive buffer is a first-in-first-out (FIFO) buffer having a head position and a tail position, wherein entries are written to the tail position and are promoted through the FIFO buffer to the head position, and wherein retrieving the first frame from the receive buffer comprises reading the frame at the head position, further comprising providing a bypass circuit coupled to the header storage, wherein if no duplicated header information is available at the head of the header storage, the bypass circuit makes next-received duplicated header information immediately available.

4. A frame buffer system comprising:
a receive buffer configured to store a plurality of received frames, wherein the receive buffer is configured to be accessed in first-in-first-out fashion;
a plurality of timers associated with the frames in the receive buffer, wherein each timer indicates the amount of time the corresponding frame has been in the receive buffer;
a header storage configured to store duplicated header information corresponding to each of the frames in the receive buffer;
transfer logic coupled to the receive buffer and header storage, wherein the transfer logic is configured to make a routing decision for delivering each of the frames in the receive buffer to a destination based on the corresponding duplicated header information read from the header storage, the routing decision being made prior to the corresponding frame reaching a head position in the receive buffer, and to transmit each of the frames to a destination port according to the corresponding routing decision; and
a bypass circuit configured to receive first duplicated header information, wherein when duplicated header information is received, if no preceding duplicated header information is currently stored in the header storage, the bypass circuit is configured to make the first duplicated header information available to the transfer logic.

5. The frame buffer system of claim 4, wherein the timers are stored in a first-in-first-out (FIFO) timer storage, wherein the timers are promoted through the FIFO timer storage as the corresponding frames are promoted through the receive buffer.

6. The frame buffer system of claim 4, wherein the timers are stored in a random access timer storage, wherein each timer is associated with one of the frames in the receive buffer.

7. The frame buffer system of claim 4, further comprising a transmit timer associated with the transmit buffer, wherein the transmit timer indicates the amount of time the frame currently residing in the transmit buffer has been in the transmit buffer.

* * * * *